(12) United States Patent
Ishimura (10) Patent No.: US 11,895,245 B2
(45) Date of Patent: Feb. 6, 2024

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Takanari Ishimura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 439 days.

(21) Appl. No.: 17/147,429

(22) Filed: Jan. 12, 2021

(65) Prior Publication Data
US 2022/0078025 A1    Mar. 10, 2022

(30) Foreign Application Priority Data
Sep. 7, 2020    (JP) .................................. 2020-149522

(51) Int. Cl.
*H04L 29/06*    (2006.01)
*H04L 9/32*    (2006.01)
*G06F 21/33*    (2013.01)
*G06F 21/62*    (2013.01)
*G06F 21/64*    (2013.01)

(52) U.S. Cl.
CPC ............ *H04L 9/3247* (2013.01); *G06F 21/33* (2013.01); *G06F 21/6209* (2013.01); *G06F 21/64* (2013.01); *G06F 2221/2143* (2013.01)

(58) Field of Classification Search
CPC ..... H04L 9/3247; H04L 9/40; H04L 63/0272; G06F 21/33; G06F 21/6209; G06F 21/64; G06F 2221/2143; G06F 21/31; G06F 21/602; G06Q 10/101
See application file for complete search history.

(56) References Cited

U.S. PATENT DOCUMENTS

| | | | | | |
|---|---|---|---|---|---|
| 5,179,557 A | * | 1/1993 | Kudo | ..................... | H04L 49/103 370/232 |
| 2009/0216829 A1 | * | 8/2009 | Terasaki | .................. | H04L 49/10 709/201 |
| 2014/0358777 A1 | * | 12/2014 | Gueh | ................. | G06Q 20/1085 705/43 |

(Continued)

FOREIGN PATENT DOCUMENTS

| | | | |
|---|---|---|---|
| JP | 2002259849 | 9/2002 | |
| JP | 2014216881 | 11/2014 | |
| WO | WO-03100544 A2 * | 12/2003 | ............. H04L 63/08 |

*Primary Examiner* — Mahfuzur Rahman
(74) *Attorney, Agent, or Firm* — JCIPRNET (57) ABSTRACT

There is provided an information processing apparatus including a memory and a processor configured to generate and hold connection information necessary for accessing document data to be signed, which is stored in the memory, via a network, transmit approval request information including connection information corresponding to the document data to a terminal device used by an approver, authenticate the approver by collating the connection information transmitted from the terminal device with the held connection information, and then perform connection to the terminal device via the network, cut off the network connection in a case where the approver finishes electronically signing the document data, and discard the connection information corresponding to the document data.

16 Claims, 8 Drawing Sheets

(56) References Cited

U.S. PATENT DOCUMENTS

| | | | |
|---|---|---|---|
| 2016/0012465 A1* | 1/2016 | Sharp | G06Q 20/321 |
| | | | 705/14.17 |
| 2018/0350180 A1* | 12/2018 | Onischuk | G07C 13/00 |
| 2020/0052961 A1* | 2/2020 | Soryal | H04L 41/0873 |
| 2021/0119991 A1* | 4/2021 | Agrawal | H04L 63/0853 |
| 2022/0263945 A1* | 8/2022 | Shinohara | H04L 61/4511 |

* cited by examiner

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-149522 filed Sep. 7, 2020.

BACKGROUND

(i) Technical Field

The present invention relates to an information processing apparatus and a non-transitory computer readable medium storing a program.

(ii) Related Art

With the progress of information security technology and network technology in recent years, various existing procedures that have been performed on paper documents can now be performed on the Internet. For example, an electronic document such as a contract created based on a contract for buying or selling a product can be presented to an approver or the like in a remote location via the Internet so that the approver can sign or seal the document electronically.

In a case of obtaining a signature from an approver in a remote location via the Internet, security issues may occur. Therefore, in JP2014-216881A, technology has been proposed in which, in a case of obtaining approval from an approval right holder, authentication information including biometric information of the approval right holder is received, and the approval by the approval right holder is allowed only after the authentication is successful based on the received biometric information.

SUMMARY

In order to exchange information with the approver, information about approver's contact information is required. However, in a case where information that specifies and authenticates the approver other than the contact information, for example, biometric information, is required, the biometric information needs to be registered in advance for the approver, which is troublesome.

Aspects of non-limiting embodiments of the present disclosure relate to an information processing apparatus and a non-transitory computer readable medium storing a program that allow an approver to sign document data while maintaining security without using information that specifies the approver other than contact information of the approver.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a memory and a processor configured to generate and hold connection information necessary for accessing document data to be signed, which is stored in the memory, via a network, transmit approval request information including connection information corresponding to the document data to a terminal device used by an approver, authenticate the approver by collating the connection information transmitted from the terminal device with the held connection information, and then perform connection to the terminal device via the network, cut off the network connection in a case where the approver finishes electronically signing the document data, and discard the connection information corresponding to the document data.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described with reference to the drawings.

First Exemplary Embodiment

Figure 1:
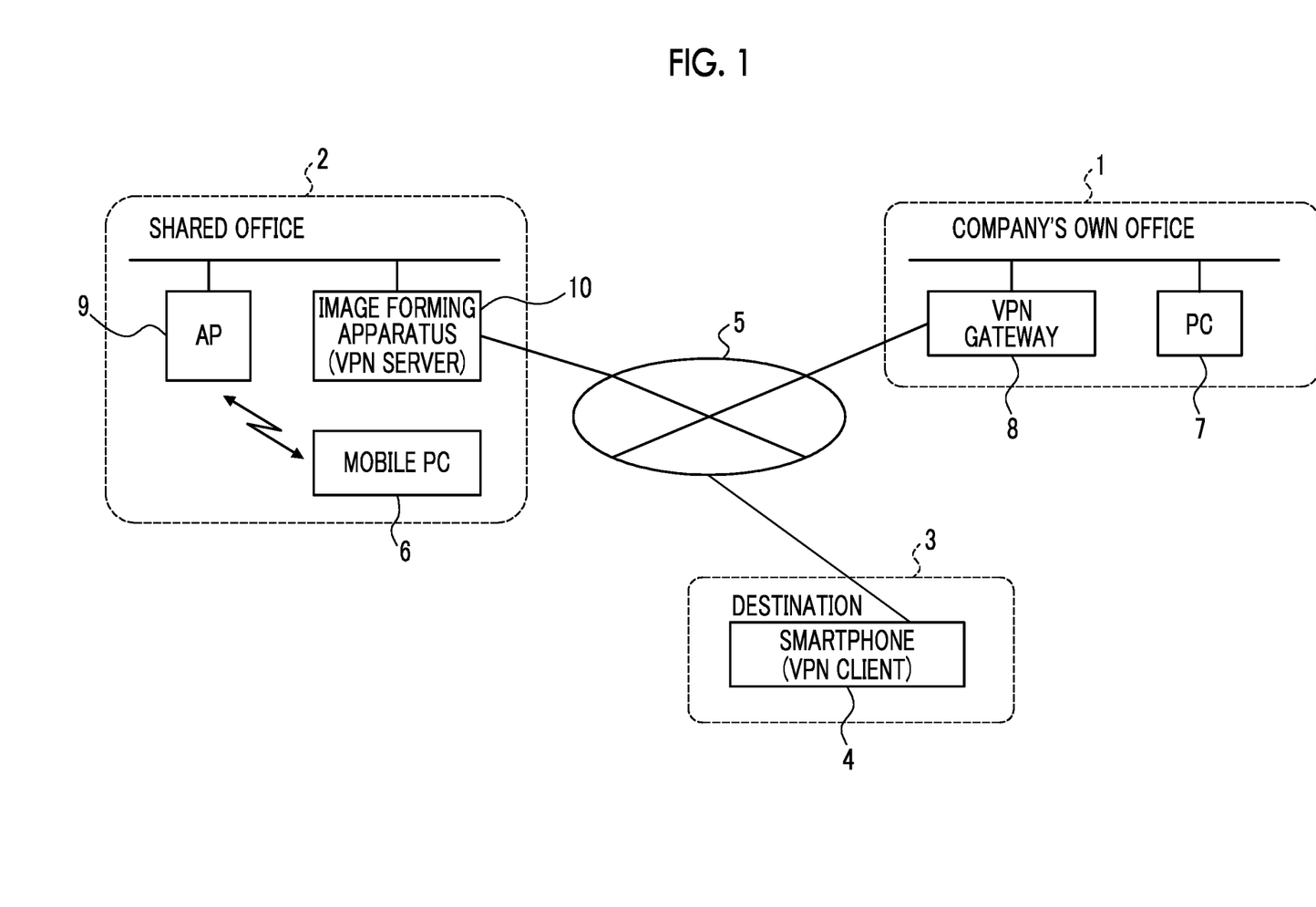
FIG. 1 is an overall configuration diagram of a network system according to a first exemplary embodiment.

FIG. 1 is an overall configuration diagram of a network system according to this exemplary embodiment. The network system in this exemplary embodiment is a network system that can be applied in a case where document data is electronically signed via the Internet 5 while maintaining security. FIG. 1 shows the configuration in which a company's own office 1 where a user is engaged, a shared office 2 used by the user, and a smartphone 4 carried by another user of the company at a destination 3 are connected via the Internet 5. Further, a mobile personal computer (PC) 6 is an information processing apparatus carried by the user. In FIG. 1, since the mobile PC 6 is illustrated in the shared office 2, which indicates that the user is located in the shared office 2.

A PC 7 and a virtual private network (VPN) gateway 8 are connected to a local area network (LAN) and installed in the company's own office 1. An access point (AP) 9 and an image forming apparatus 10 are connected to a LAN and installed in the shared office 2.

The destination 3 indicates a place other than the company's own office 1 and the shared office 2, and it does not matter whether the place is indoors or outdoors. The smartphone 4 needs only to be in an environment in which the mobile PC 6 in the shared office 2 and the VPN can be connected.

The mobile PC 6 in the shared office 2 is wirelessly connected to the access point 9 to be connected to the image forming apparatus 10 as an information processing apparatus. The image forming apparatus 10 is equipped with a function as a VPN server, the smartphone 4 is equipped with a function as a VPN client, and the VPN gateway 8 is equipped with a function of relaying VPN communication. Thus, the mobile PC 6, the smartphone 4, and the PC 7 can communicate with each other via the VPN while maintaining the security. The technology itself related to VPN communication uses the existing technology.

Figure 2:
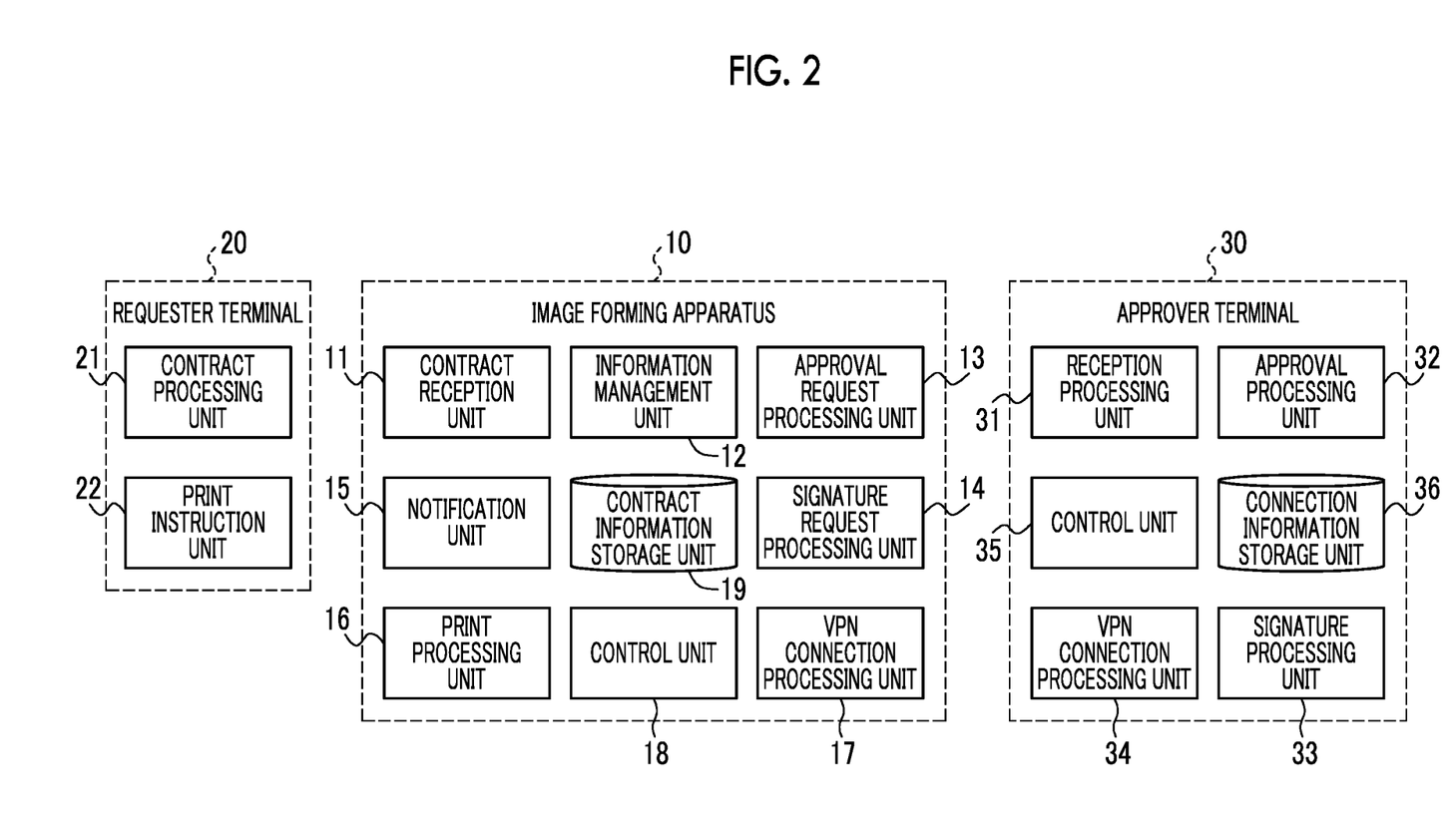
FIG. 2 is a block configuration diagram of the network system according to the first exemplary embodiment.

FIG. 2 is a block configuration diagram of the network system according to this exemplary embodiment. FIG. 2 shows a requester terminal 20, the image forming apparatus 10, and an approver terminal 30. The requester terminal 20 is a terminal device used by a user requesting a signature, and the mobile PC 6 shown in FIG. 1 corresponds to the requester terminal 20. Since a user who carries and uses the mobile PC 6 requests an electronic signature of document data, the user is referred to as a "requester". The approver terminal 30 is a terminal device used by a user who performs an electronic signature in response to a request from the requester, and the PC 7 and the smartphone 4 shown in FIG. 1 correspond to the approver terminal 30. Since a user who uses the PC 7 or the smartphone 4 approves document data and electronically signs the document data, the user is referred to as an "approver" or a "signer". In the case of this exemplary embodiment, the approver and the signer are synonymous. In a case where there is only one approver, the approver and the signer are the same person.

Figure 3:
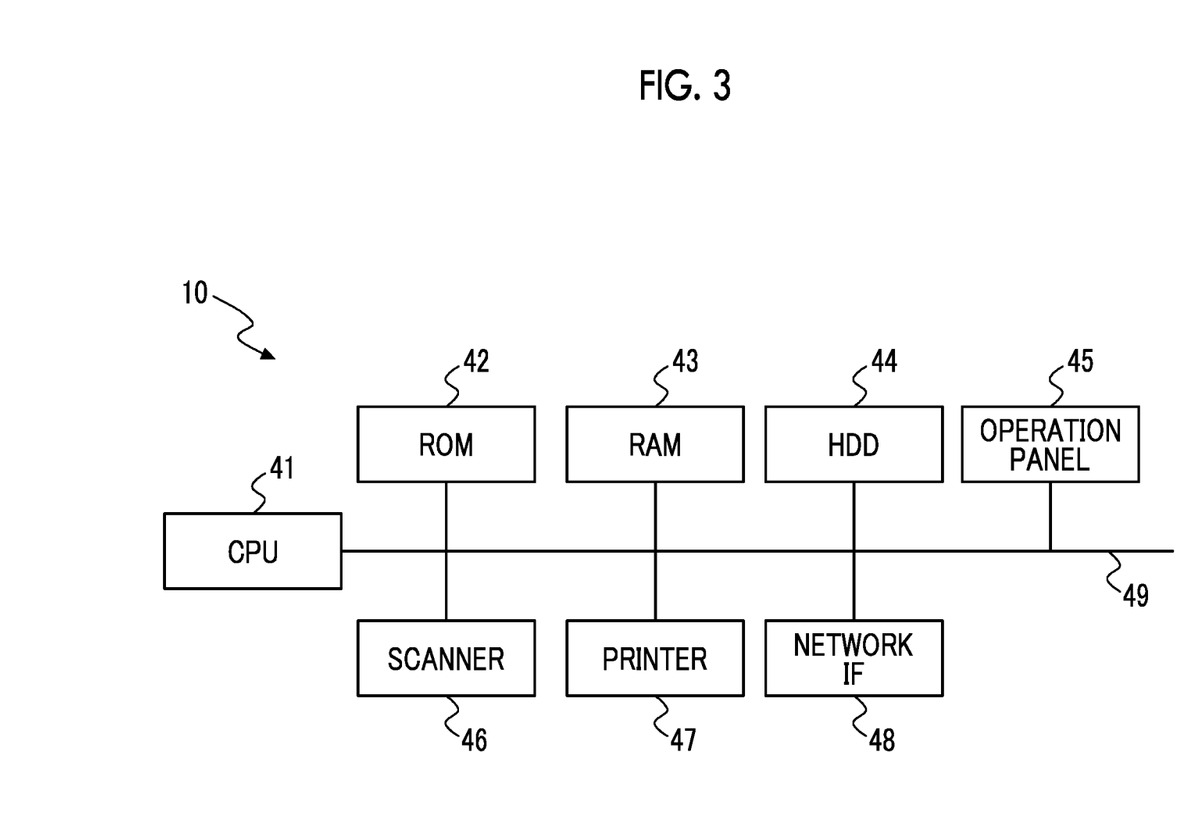
FIG. 3 is a hardware configuration diagram of an image forming apparatus according to the first exemplary embodiment.

FIG. 3 is a hardware configuration diagram of the image forming apparatus 10 according to this exemplary embodiment. The image forming apparatus 10 is a multifunction device equipped with various functions such as a copy function, a print function, and a scanner function, and is an apparatus having a built-in computer. In the case of this exemplary embodiment, it is necessary that a confidential box function and a VPN connection are also installed. In FIG. 3, various programs related to control of this apparatus, encryption of electronic data, and transmission and reception of electronic data are stored in a ROM 42, and a CPU 41 controls the operations of various mechanisms mounted on this apparatus, such as a scanner 46 and a printer 47, according to the programs stored in the ROM 42. A RAM 43 is used as a work memory at the time of executing a program and as a communication buffer at the time of transmitting and receiving electronic data. A hard disk drive (HDD) 44 stores an electronic document or the like read by using the scanner 46. A confidential box in which a contract is saved is formed in the HDD 44. An operation panel 45 receives instructions from the user and displays information. The scanner 46 reads a document set by the user and accumulates the document in the HDD 44 or the like as electronic data. The printer 47 prints an image on the output paper according to an instruction from the control program executed by the CPU 41. A network interface (IF) 48 is used for connecting a network, transmitting and receiving electronic data to and from an external device, and accessing this apparatus via a browser. Further, in the case of this exemplary embodiment, network communication via the LAN is also performed. An address data bus 49 performs data communication by connecting to various mechanisms to be controlled by the CPU 41.

Referring back to FIG. 2, the image forming apparatus 10 includes a contract reception unit 11, an information management unit 12, an approval request processing unit 13, a signature request processing unit 14, a notification unit 15, a print processing unit 16, a VPN connection processing unit 17, a control unit 18, and a contract information storage unit 19. Note that, components not used in the description of this exemplary embodiment will be omitted from the drawings. The same applies to the requester terminal 20 and the approver terminal 30, which will be described later.

In this exemplary embodiment, a contract will be described as an example of document data to be signed, and the contract reception unit 11 receives a contract transmitted from the requester terminal 20 and saves the contract in the contract information storage unit 19. Strictly speaking, a contract that has been converted into electronic data is received, but for convenience of description, it is simply described as a "contract".

Tag information and the like are added to the contract saved in the contract information storage unit 19, as will be described later, and the information management unit 12 manages the contract and the information added to the contract. The approval request processing unit 13 requests the approver who uses the approver terminal 30 to approve the content of the contract by transmitting approval request information to the approver terminal 30. The signature request processing unit 14 requests the approver to electronically sign the contract. In this exemplary embodiment, one of the features is that the approver can directly electronically sign the contract saved in the contract information storage unit 19 by accessing the contract information storage unit 19 of the image forming apparatus 10 from the approver terminal 30.

The "electronic signature" or "electronically signing" referred to in this exemplary embodiment means making predetermined writing to a predetermined signature area of the contract saved in the contract information storage unit 19, or the content written in the predetermined signature area. Writing may be performed by various contents and methods such as stamping and signature of an electronic seal stamp, for example, and the contract may be valid as a contract by an electronic signature. In the following description, the act of electronically signing a contract that has been converted into electronic data and the writing performed on a predetermined signature area of the contract are simply referred to as a "signature" for convenience.

The notification unit 15 notifies the requester that the approver has approved an approval request or that a comment has been described. In addition, the notification unit 15 notifies the requester that the approver has signed in response to the signature request. The print processing unit 16 prints the contract according to the instruction from the requester or according to the setting in the contract. The VPN connection processing unit 17 performs a VPN connection with a communication partner and cuts off the VPN connection. The control unit 18 controls the operations of the components 11 to 17.

The contract is saved in the contract information storage unit 19 as described above. In the contract, electronic data serving as the contract is associated with a contract ID and a contract name as identification information that identifies the contract, tag information, and connection information. The tag information includes flag information indicating whether or not the contract needs to be output when the approver signs the contract, in other words, whether or not the signed contract needs to be printed. The connection information is information necessary for accessing the contract via the Internet 5, and specifically, includes an address and a password for accessing the image forming apparatus 10.

Each of the components 11 to 18 in the image forming apparatus 10 is implemented by a cooperative operation of a computer mounted on the image forming apparatus 10 and a program running on the CPU 41 mounted on the computer. Further, the contract information storage unit 19 is implemented at the HDD 44 mounted on the image forming apparatus 10. Alternatively, the RAM 43 or an external memory may be used via the network.

The requester terminal 20 includes a contract processing unit 21 and a print instruction unit 22. The contract processing unit 21 creates a contract based on the contract with the contractor and transmits the contract to the image forming apparatus 10. In a case where the approver makes a comment on the contract, the contract processing unit 21 amends the contract saved in the contract information storage unit 19 based on the content of the comment. The print instruction unit 22 instructs the image forming apparatus 10 to print the signed contract according to the instruction from the requester.

Each of the components 21 and 22 in the requester terminal 20 is implemented by a cooperative operation of a computer forming the requester terminal 20 and a program running on a CPU mounted on the computer.

The approver terminal 30 includes a reception processing unit 31, an approval processing unit 32, a signature processing unit 33, a VPN connection processing unit 34, a control unit 35, and a connection information storage unit 36. The reception processing unit 31 receives a request transmitted from the image forming apparatus 10. The approval processing unit 32 performs approval processing in response to an approval request from the image forming apparatus 10. The signature processing unit 33 performs signature processing in response to a signature request from the image forming apparatus 10. The VPN connection processing unit 34 performs a VPN connection with a communication partner and cuts off the VPN connection. The control unit 35 controls the operations of the components 31 to 34.

The connection information storage unit 36 saves the contract ID in association with the connection information included in the approval request information transmitted at the time of the approval request from the image forming apparatus 10.

Each of the components 31 to 35 in the approver terminal 30 is implemented by a cooperative operation of a computer forming the approver terminal 30 and a program running on a CPU mounted on the computer. Further, the connection information storage unit 36 is implemented at the HDD mounted on the approver terminal 30. Alternatively, the RAM or an external memory may be used via the network.

Further, the program used in this exemplary embodiment can be provided not only by a communication unit but also by storing the program in a computer-readable recording medium such as a CD-ROM or a USB memory. The programs provided from the communication unit or the recording medium are installed in a computer, and various processes are implemented by sequentially executing the programs by the CPU of the computer.

In a case where a salesperson corresponding to the above requester receives an order from a customer, the salesperson returns to the nearby shared office 2 and operates the mobile PC 6 to create a contract. In order for the created contract to be valid, it is necessary to obtain approval from one or more managers such as a superior (corresponding to the above "approver") and obtain signatures. Hereinafter, in this exemplary embodiment, the flow of processing for obtaining approval and a signature of the contract will be described with reference to the sequence diagrams shown in FIGS. 4A and 4B.

Figure 4A:
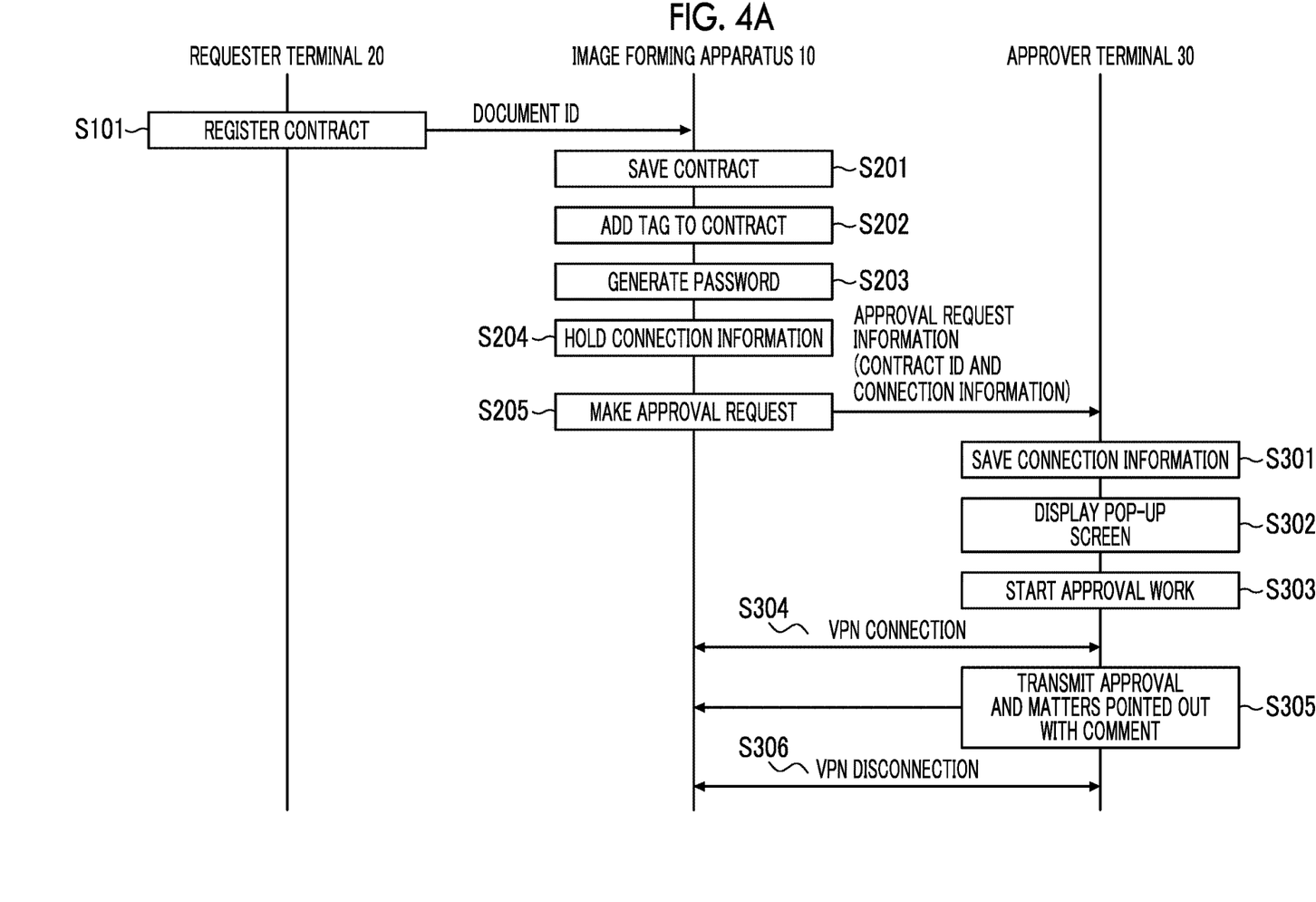
FIG. 4A is a sequence diagram of a process of electronically signing a contract in the first exemplary embodiment.
Figure 4B:
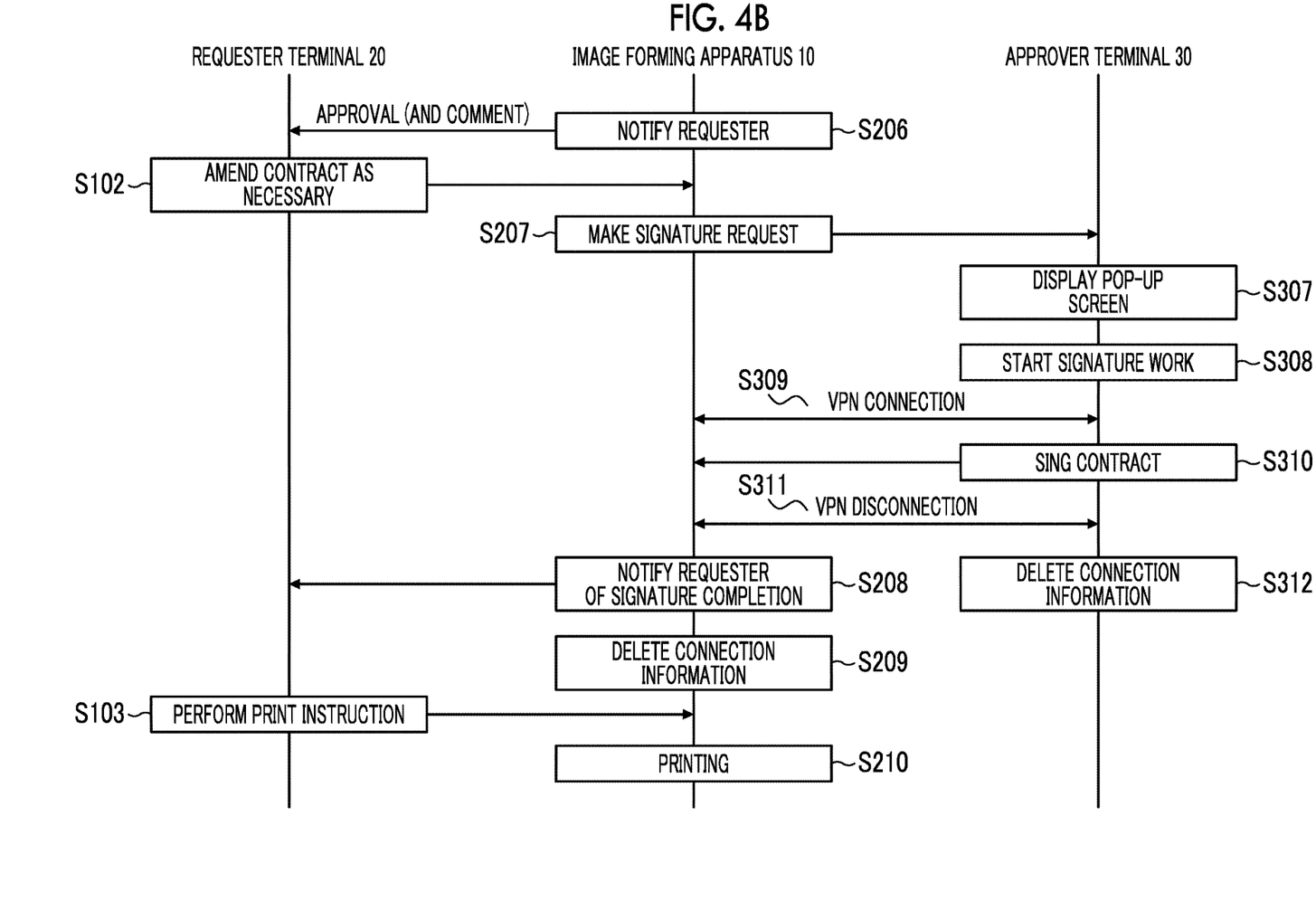
FIG. 4B is a sequence diagram following FIG. 4A.

In some cases, the contract is approved and signed by a plurality of approvers, but the operations performed by each approver and the processing performed by the approver terminal 30 may be the same. Accordingly, unless otherwise specified, it is described as requesting approval and a signature from one approver.

As described above, in a case where the requester creates a contract using the requester terminal 20, the contract processing unit 21 in the requester terminal 20 transmits the created contract to the image forming apparatus 10 to register the contract in the image forming apparatus 10 (step S101).

The contract reception unit 11 in the image forming apparatus 10 adds a contract ID and a contract name for identifying the contract to the transmitted contract and saves the contract in a confidential box of the requester prepared in advance for the contract information storage unit 19 (step S201). The requester or a pre-authorized manager of the company in which the requester is engaged can access the file saved in the confidential box, and users other than the requester who uses the shared office 2 cannot access the file. Further, the contract name added to the contract may use a file name of the contract data, or may be extracted by text analysis of the contract. Alternatively, the requester may be caused to designate the contract ID and the contract name.

Further, the contract reception unit 11 in this exemplary embodiment acquires the electronic data of the contract from the requester terminal 20, but the requester may have the paper contract read by a scanner and obtain the electronic data of the contract from the read image.

Subsequently, the information management unit 12 determines from the title of the contract and the content of the contract whether the contract or delivery by paper is obligatory. In a case where determination is made that the contract or delivery by paper is obligatory, flag information indicating that printing is required when signed by the approver is included in tag information, and the tag information is added to the contract (step S202).

Further, the information management unit 12 generates a password required for a VPN connection with the approver terminal 30 by generating a random number (step S203), generates connection information including an address of the image forming apparatus 10 (hereinafter, a "VPN connection address") and the generated password, and adds and holds the connection information to the contract (step S204).

In a case where the information related to the contract is generated as described above, the approval request processing unit 13 requests the approver for approval by transmitting approval request information including a contract ID and connection information (in other words, a VPN connection address and a password) to the approver terminal 30 (step S205).

By the way, the transmission destination of the approval request information may be determined by referring to an address book in which the contact information is registered. That is, the address book contains personal information of the user who belongs to the company in which the requester is engaged. Further, in the address book, information indicating a user (that is, a manager who may be an approver) who is in a position to approve and sign the contract created by the requester is set. Therefore, the approval request processing unit 13 refers to the address book and acquires the address of the approver terminal 30 used by the user requesting approval (that is, the approver).

The approval request processing unit 13 acquires the address book from the company's own office 1, a cloud that manages the information, or the like, and saves the address book in the confidential box of the requester from the viewpoint of security. By referring to the address book, the image forming apparatus 10 can allow the approver of the requester to access the contract saved in the confidential box of the requester.

However, the image forming apparatus 10 is installed in the shared office 2 and is also used by a third party other than the company in which the requester is engaged. Therefore, the approval request processing unit 13 may acquire the acquired address book when necessary and delete the address book from the image forming apparatus 10 after use. Since the address book is also referred to in the case of requesting a signature, the address book may be operated so as to be deleted from the image forming apparatus 10 after requesting the signature.

The reception processing unit 31 in the approver terminal 30 receives the information transmitted from the image forming apparatus 10. In a case where the information is approval request information, the control unit 35 activates the approval processing unit 32 to perform approval processing. In a case where the approval processing unit 32 is activated, the contract ID is added to the connection information and saved in a memory such as an internal HDD or RAM (step S301).

In order to improve security, the image forming apparatus 10 may encrypt at least the password with a public key of each approver, and the approver terminal 30 may decrypt the encrypted information with a private key of the approver and then save the decrypted information.

Subsequently, the approval processing unit 32 displays a pop-up screen on a display unit (for example, a display or an operation panel) of the approver terminal 30 to notify the approver that the approval request for the contract has arrived (step S302). A start button is displayed on the pop-up screen, and the approver selects the start button to start an approval work (step S303).

In the approval work, a VPN connection is first performed (step S304). The VPN connection is performed in cooperation with the VPN connection processing unit 34 of the approver terminal 30 and the VPN connection processing unit 17 of the image forming apparatus 10. Specifically, the VPN connection processing unit 34 refers to the saved connection information to specify the image forming apparatus 10 as the connection destination, and makes a connection request including the connection information to the image forming apparatus 10. The VPN connection processing unit 17 authenticates the approver terminal 30, which is the communication partner, that is, the approver who is a request destination for approval by collating the connection information included in the connection request with the connection information saved in the contract information storage unit 19. In a case where the VPN is connected and established between the approver terminal 30 and the image forming apparatus 10, information is exchanged between the approver terminal 30 and the image forming apparatus 10 via the VPN.

The approver performs a predetermined operation to display the contract saved in the image forming apparatus 10 on the screen. More specifically, the approval processing unit 32 displays, on the screen, a contract corresponding to the contract ID included in the approval request information received by the reception processing unit 31 from the document data saved in the contract information storage unit 19.

Then, in a case where the approver determines that there is no problem with the content of the contract and selects a predetermined operation, for example, an approval button, the approval processing unit 32 transmits to the image forming apparatus 10 that the content of the contract is approved according to the predetermined operation (step S305). However, in a case where there are matters to be pointed out or amendment instructions in the content of the contract, the approver inputs a comment indicating the content in a predetermined area of the screen. The approval processing unit 32 transmits the input comment to the image forming apparatus 10 (step S305).

In a case where the approval work described above is finished, the VPN connection processing unit 17 of the image forming apparatus 10 disconnects the VPN from the approver terminal 30 (step S306). As will be described later, information is exchanged between the approver terminal 30 and the image forming apparatus 10 via the VPN even at the time of signing, but in this exemplary embodiment, in order to avoid the VPN connection state for a long time, the VPN is disconnected at the time when the approval work has been finished. In this way, the security is improved.

The approval request processing unit 13 receives approval or a comment from the approver terminal 30 in response to the approval request. Subsequently, the notification unit 15 notifies the requester by transmitting the content received by the approval request processing unit 13 to the requester terminal 20 (step S206).

The requester confirms that the approval has been performed by the approver, but in a case where determination is made that the content of the contract needs to be amended by referring to the comments, the amendment is made. That is, the contract processing unit 21 amends the contract saved in the contract information storage unit 19 according to the amendment operation of the requester (step S102).

In addition, although the case where there is one approver is described here as an example, in a case where there are a plurality of approvers, the requester amends the contract as necessary after receiving responses (in other words, approval or a comment) from all approvers to the approval request made to all the approvers.

In a case where the approval is received from the approver as described above, the signature request processing unit 14 requests the approver to sign (step S207). This request needs only to include the contract ID of the contract to be signed.

The reception processing unit 31 in the approver terminal 30 receives the information transmitted from the image forming apparatus 10. In a case where the information is a signature request, the control unit 35 activates the signature processing unit 33 to perform signature processing.

In a case where the signature processing unit 33 is activated, the signature processing unit 33 displays a pop-up screen on the display unit of the approver terminal 30 to notify the approver that the signature request for the contract has arrived (step S307). A start button is displayed on the pop-up screen, and the approver selects the start button to start a signature work (step S308).

In the signature work, the approver is authenticated in the same manner as the approval work, and the VPN is connected between the approver terminal 30 and the image forming apparatus 10 (step S309).

In a case where the approver is authenticated as described above, the approver performs a predetermined operation through the approver terminal 30 to display the contract saved in the image forming apparatus 10 on the screen and sign the predetermined signature area (step S310). In this exemplary embodiment, instead of taking a copy of the contract to be signed into the approver terminal 30 and having the copy signed, the approver is made to directly sign the contract saved in the contract information storage unit 19 via the VPN.

In a case where the signature work is finished, the VPN established between the approver terminal 30 and the image forming apparatus 10 is disconnected in the same manner as in the case of the approval work (step S311).

Further, in a case where the VPN is disconnected, the signature processing unit 33 deletes the connection information corresponding to the contract to be signed, which is saved in the connection information storage unit 36 (step S312).

The signature request processing unit 14 detects that the signature by the approver has been completed by constantly monitoring the writing to the signature area in the contract. Subsequently, the notification unit 15 notifies the requester by transmitting the signature completion notification received by the signature request processing unit 14 to the requester terminal 20 (step S208). In a case where there are a plurality of approvers, it is considered that the signature is completed by the finish of the signature by all the approvers. Subsequently, the signature request processing unit 14 deletes the connection information corresponding to the contract stored in the contract information storage unit 19 (step S209).

In a case where the signed contract becomes available, the requester prints the contract. Specifically, in a case where the requester requests printing by performing a predetermined operation through the requester terminal 20, the print instruction unit 22 designates a contract to be printed and instructs the image forming apparatus 10 to print (step S103).

The print processing unit 16 in the image forming apparatus 10 prints the contract according to the print instruction from the requester terminal 20 (step S210). Here, printing is performed in response to the request from the requester, but as described above, the tag information including the flag information regarding the necessity of printing is added to the contract, so that the print processing unit 16 may automatically perform printing by referring to the flag information. Alternatively, the print processing unit 16 may automatically perform printing when the signature has been completed (step S208) regardless of the presence or absence of the flag information.

In this exemplary embodiment, in a case where the contract is approved and signed, the connection information generated by the image forming apparatus 10 is transmitted to the approver terminal 30, and the approver terminal 30, that is, the approver is authenticated by the connection information. Therefore, it is possible to have the approver sign the contract while maintaining security without using information such as biometric information that identifies the approver.

By the way, in the above description, the case where there is only one approver has been described. In a case where there are a plurality of approvers, the operation in the approver terminal 30 used by each approver is as described above. On the other hand, the image forming apparatus 10 generates connection information for each approver in step S204, and holds the generated connection information in association with each approver. Then, the contract can be treated as an approved contract only after the signature request is made (step S207) and all the approvers sign.

In this exemplary embodiment, in order to have the approver check the content of the contract, and to be able to amend the content of the contract as necessary, the approver is made to go through a two-step process, approval to confirm the content of the contract and a signature to prove the approval. However, it is not always necessary to separate the approval and the signature.

Further, in a case where there are a plurality of approvers, the approval request processing unit 13 may sequentially transmit the approval request to the approver terminal 30 used by each approver, but by simultaneously transmitting the approval request, the processes for a plurality of approvers may be performed in parallel at the same time. Similarly, the signature request processing unit 14 may sequentially transmit the signature request to the approver terminal 30 used by each approver, but by simultaneously transmitting the signature request, the processes for a plurality of approvers may be performed in parallel at the same time.

By the way, in this exemplary embodiment, the approver is notified that the approval request or the signature request has been received by displaying the pop-up screen on the approver terminal 30. Nevertheless, it is also conceivable the case where the approver does not immediately respond to the request for approval and a signature of the contract. Therefore, for approval of the contract or for signing within a predetermined time, the approver who does not access the contract saved in the contract information storage unit 19 may be prompted to access the contract. Specifically, the approval request processing unit 13 holds the requested date and time in association with the connection information when requesting approval, and displays the pop-up screen again at the time when a predetermined time has elapsed after requesting the approval or transmits a message or the like prompting the approval work to be started immediately to display the message on the screen. The signature request processing unit 14 also performs the same processing to prompt the signature work to be started immediately.

In this exemplary embodiment, the case where the VPN is used as the form of the network connecting the approver terminal 30 and the image forming apparatus 10 has been described as an example, but in a case where security can be maintained by using other methods such as encryption processing, it is not always necessary to use the VPN.

The modification example of the above-described exemplary embodiment can also be applied to a second exemplary embodiment described later.

Second Exemplary Embodiment

Figure 5:
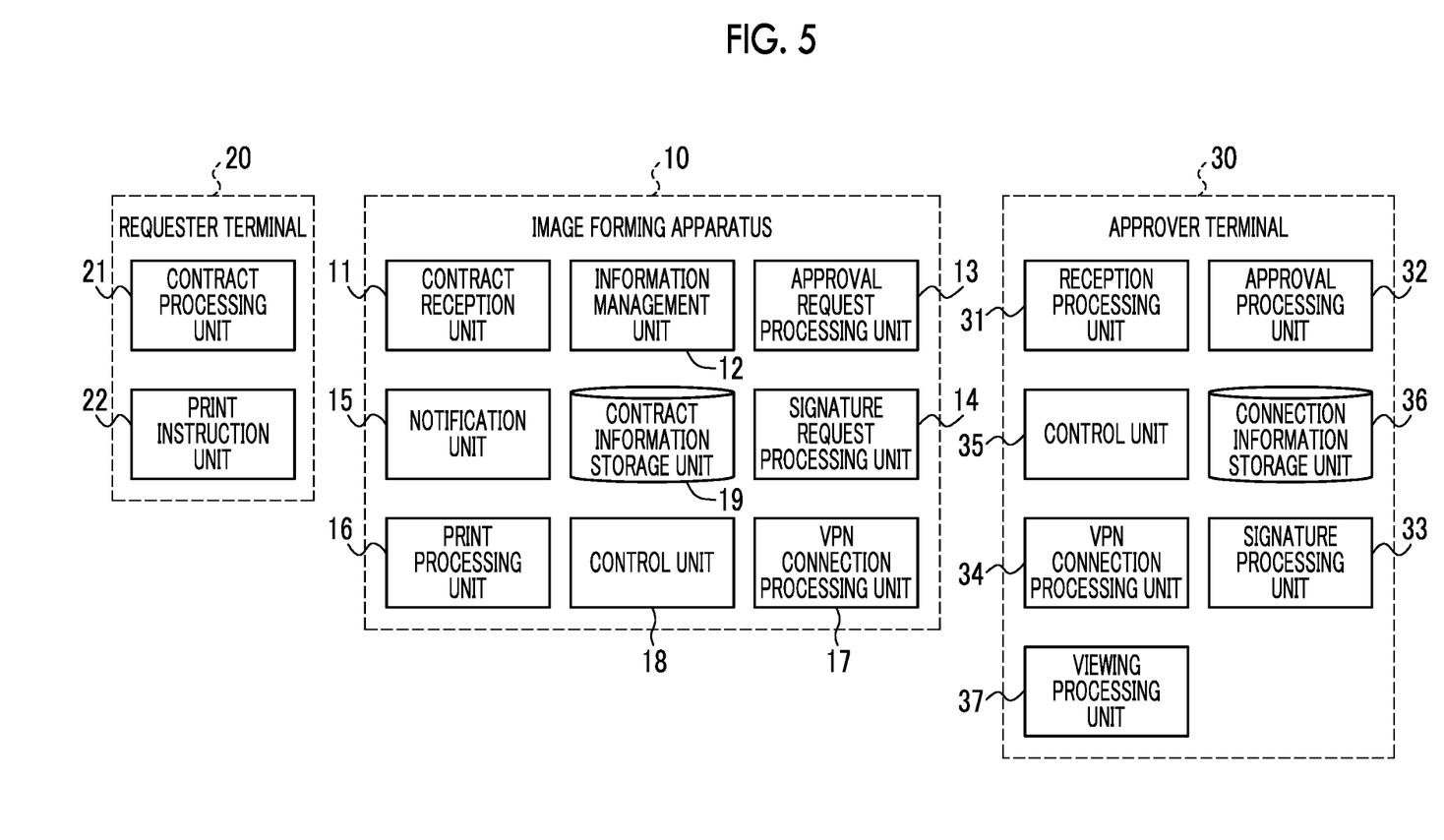
FIG. 5 is a block configuration diagram of a network system according to a second exemplary embodiment.

FIG. 5 is a block configuration diagram of a network system according to this exemplary embodiment. The same components as the components in the first exemplary embodiment are denoted by the same reference numerals, and the description thereof will be omitted. The network system in this exemplary embodiment has a configuration in which a viewing processing unit 37 is added to the approver terminal 30 shown in the first exemplary embodiment. The viewing processing unit 37 displays a designated contract on a screen according to an instruction from the approver. The viewing processing unit 37 is implemented by a cooperative operation of a computer forming the approver terminal 30 and a program running on a CPU mounted on the computer.

In the first exemplary embodiment, the approver is requested to process the contract in two steps of approval and a signature, and the VPN is connected in each process. A password is used in making the VPN connection, but in the first exemplary embodiment, a common password is used for approval and a signature. In contrast, this exemplary embodiment is characterized in that a password is set for each of approval and a signature.

The configuration of the network system (FIG. 1) and the hardware configuration of the image forming apparatus 10 (FIG. 3) in this exemplary embodiment may be the same as the configurations in the first exemplary embodiment. In this exemplary embodiment, the process of generating, using, and deleting the password in the process of electronically signing the contract is different from the process of the first exemplary embodiment. Hereinafter, in this exemplary embodiment, the flow of processing for obtaining approval and a signature of the contract will be described with reference to the sequence diagrams shown in FIGS. 6A and 6B. The same process as in the first exemplary embodiment (FIGS. 4A and 4B) is given the same step number, and the description thereof will be omitted as appropriate.

Figure 6A:
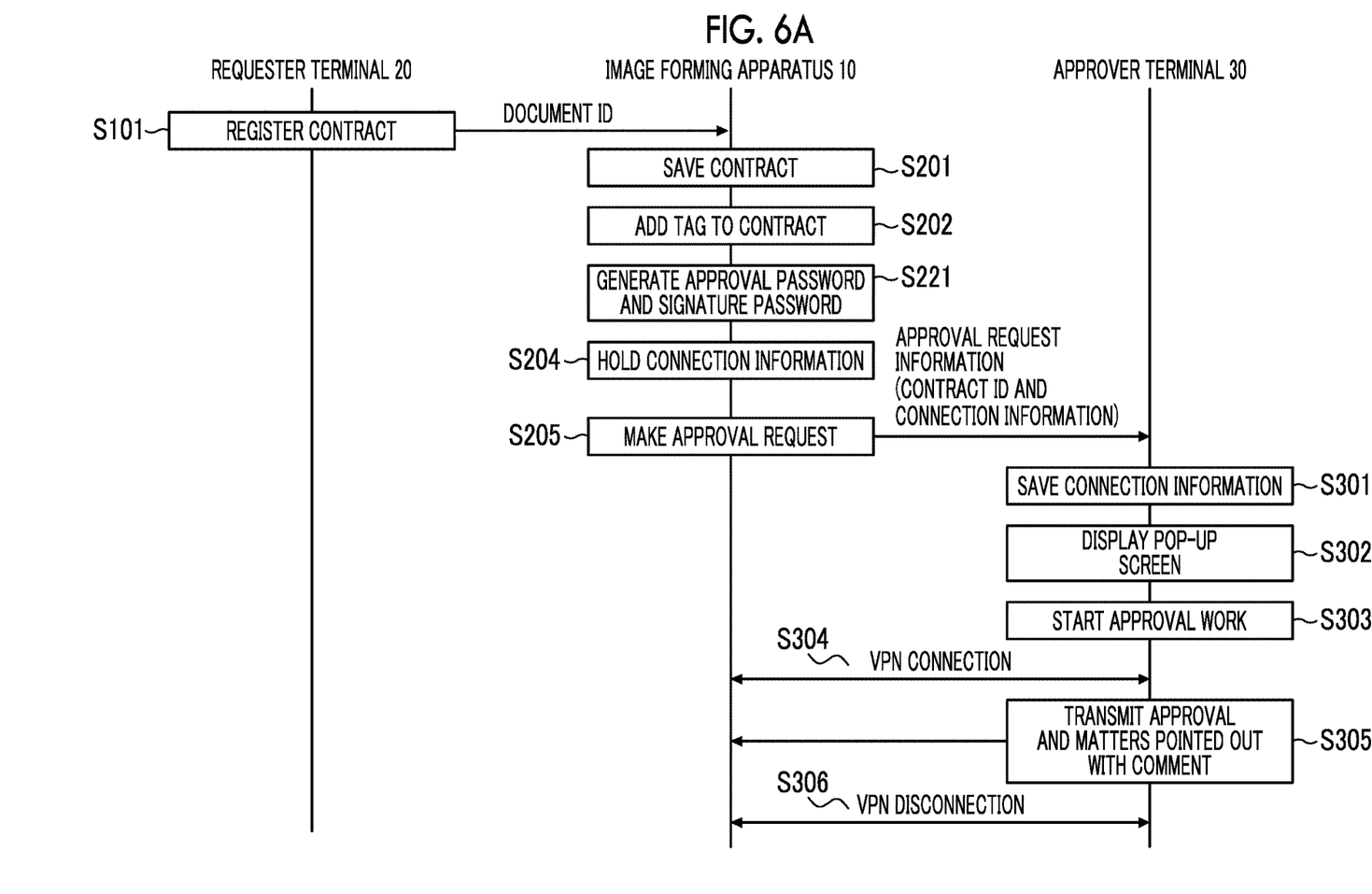
FIG. 6A is a sequence diagram of a process of electronically signing a contract in the second exemplary embodiment.

In the image forming apparatus 10, the information management unit 12 generates and holds the connection information together with the tag information (steps S202 and S204), but the information management unit 12 in this exemplary embodiment generates two types of passwords, an approval password used for approval and a signature password used for signing, as passwords required for the VPN connection by generating random numbers (step S221). In this exemplary embodiment, the approval password and the signature password are generated so as to be different passwords. As will be described later, the approval password corresponds to a viewing password.

The information management unit 12 generates connection information including a VPN connection address and two types of passwords, an approval password and a signature password, and adds and holds the connection information to the contract (step S204).

In response to this, the approval request processing unit 13 requests the approver for approval by transmitting the approval request information including the contract ID and the connection information (in other words, the VPN connection address and the two types of passwords) to the approver terminal 30 (step S205).

The approval processing unit 32 adds the contract ID to the connection information in response to the approval request and saves the information in the memory (step S301), but the approval processing unit 32 in this exemplary embodiment saves the two types of passwords, the approval password and the signature password.

Then, in the approval processing performed in response to the approval request, the VPN connection processing unit 34 transmits the connection request including the connection information to the image forming apparatus 10, but at this time, only the approval password is included in the connection request and transmitted. The VPN connection processing unit 17 authenticates the approver terminal 30, which is the communication partner, that is, the approver who is a request destination for approval by collating the connection information included in the connection request with the connection information saved in the contract information storage unit 19, and here, the approver is successfully authenticated by matching the approval password. Then, in a case where the authentication is successful, the VPN is connected (step S304) and the approval work for the contract is performed.

By the way, as described above, in step S304, the VPN is connected by matching the approval password. Therefore, the image forming apparatus 10 recognizes that the VPN connected in step S304 is connected for the purpose of approval. Therefore, even when the approver accesses the contract saved in the image forming apparatus 10 for signing, the image forming apparatus 10 does not allow the signature. In this way, the approver can approve the contract via the VPN established with the approval password, but cannot sign the contract. In this exemplary embodiment, the purpose of accessing the contract saved in the image forming apparatus 10, in other words, the purpose of using the VPN is clarified.

Figure 6B:
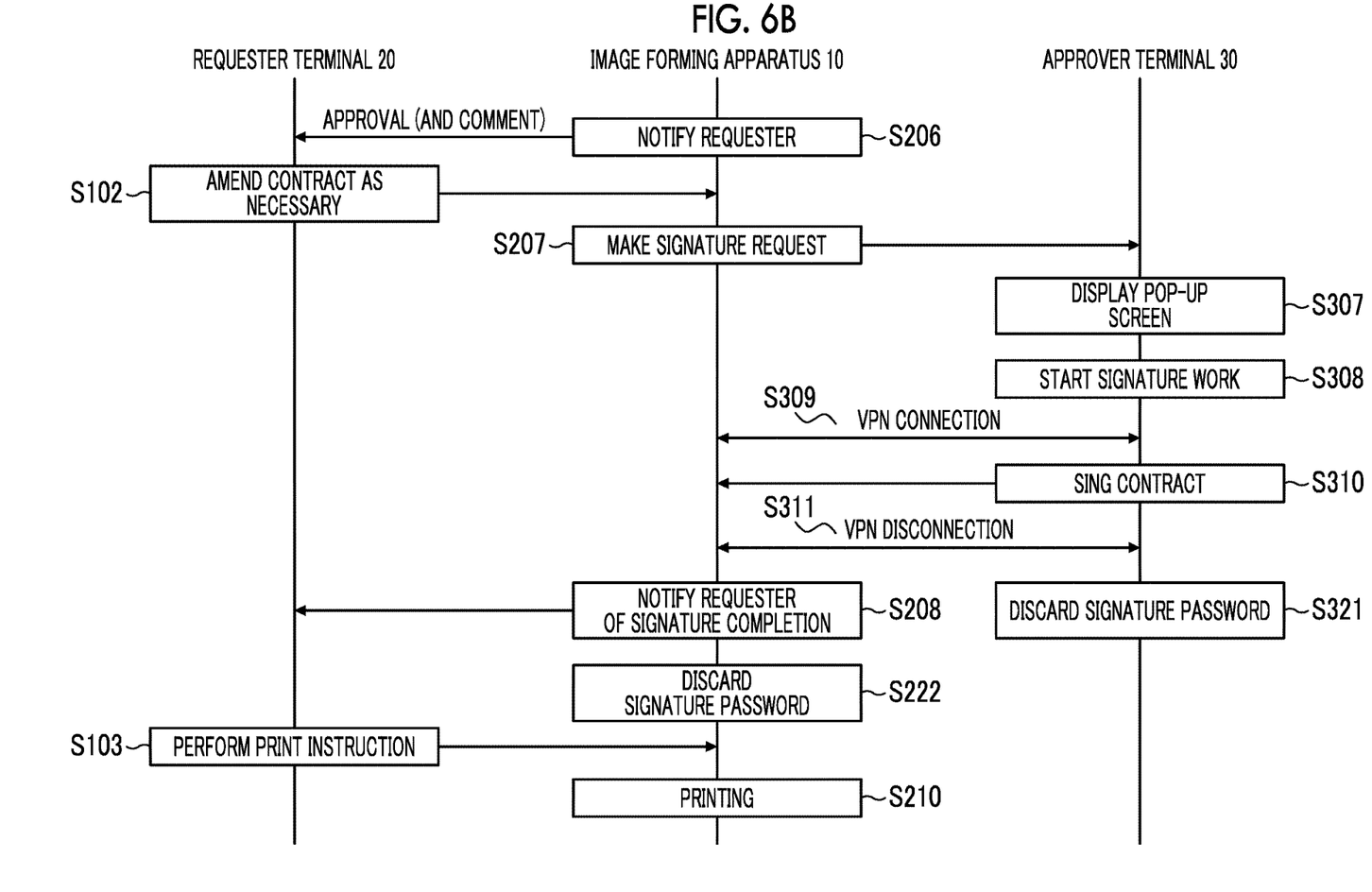
FIG. 6B is a sequence diagram following FIG. 6A.

In a case where the approval work is finished, the VPN connection processing unit 17 of the image forming apparatus 10 disconnects the VPN from the approver terminal 30 (step S306). After that, in a case where the approval of the contract is completed, the signature request processing unit 14 requests the signature (step S207). In the signature processing performed in response to the signature request, the VPN connection processing unit 34 transmits the connection request including the connection information to the image forming apparatus 10, but at this time, only the signature password is included in the connection request and transmitted. The VPN connection processing unit 17 authenticates the approver terminal 30, which is the communication partner, that is, the approver who is a request destination for approval by collating the connection information included in the connection request with the connection information saved in the contract information storage unit 19 and here, the approver is successfully authenticated by matching the signature password. Then, in a case where the authentication is successful, the VPN is connected (step S309) and the signature work for the contract is performed. In a case where the signature work is finished, the VPN connection processing unit 17 of the image forming apparatus 10 disconnects the VPN from the approver terminal 30 (step S311).

By the way, as described above, in step S309, the VPN is connected by matching the signature password. Therefore, the image forming apparatus 10 recognizes that the VPN connected in step S309 is connected for the purpose of a signature. Therefore, even when the approver accesses the contract saved in the image forming apparatus 10 for approval, the image forming apparatus 10 does not allow the approval. In this way, the approver can sign the contract via the VPN established with the signature password, but cannot approve the contract or send comments.

In a case where the VPN is disconnected (step S311), the signature processing unit 33 in this exemplary embodiment discards only the signature password among the passwords included in the saved connection information (step S321). On the other hand, also in the image forming apparatus 10, the signature request processing unit 14 discards only the signature password among the passwords included in the connection information corresponding to the contract stored in the contract information storage unit 19 (step S222).

As described above, in this exemplary embodiment, only the signature password used for the VPN connection at the time of signing is deleted form among the passwords included in the connection information, and the approval password is left. Thus, the approver cannot sign the contract after that due to the deletion of the signature password.

By the way, as described above, after the approver signs the contract, the contract may be viewed for reasons such as confirming the content of the contract. Therefore, the viewing processing unit 37 instructs the VPN connection processing unit 34 to perform a VPN connection with the image forming apparatus 10 as in the case of approval and signing. The VPN connection processing unit 34 transmits the connection request including the connection information to the image forming apparatus 10 according to this instruction, but at this time, only the approval password is included in the connection request and transmitted. In this exemplary embodiment, the approval password is transmitted to the image forming apparatus 10 as the viewing password in order to allow only viewing without signing the contract, in other words, by prohibiting writing to the contract.

The VPN connection processing unit 17 authenticates the approver terminal 30, which is the communication partner, that is, the approver who is a request destination for approval by collating the connection information included in the connection request with the connection information saved in the contract information storage unit 19, and here, the approver is successfully authenticated by matching the approval password. Then, in a case where the authentication is successful, the VPN is connected. In a case where the VPN is established in this way, the viewing processing unit 37 displays the contract saved in the contract information storage unit 19 on the screen of the approver terminal 30 according to an instruction from the approver.

In this way, the approver can refer to the content of the contract after signing the contract.

By the way, in this exemplary embodiment, the approver who uses the approver terminal 30 is the approver of the contract and is also the signer. In other words, the approver and the signer are completely the same. However, depending on the content and type of contract, there may be a case in which the approver and the signer are required not to be completely matched. For example, only some approvers may be required to be signers, and alternatively, only some signers may be required to be approvers. In addition, for example, there are cases in which the approval is obtained from the superior, and the signature is obtained from the representative or the person in charge of the company.

Therefore, the approval request processing unit 13 sets both the approval password and the signature password for the user who is both the approver and the signer, includes both the passwords in the connection information, and transmits the information to the terminal used by the user. Further, the approval request processing unit 13 sets only the approval password for the user who is the approver but is not the signer, and includes the approval password in the connection information, and transmits the information to the terminal used by the user. Further, the approval request processing unit 13 sets only the signature password for the user who is not the approver but is the signer, includes the signature password in the connection information, and transmits the information to the terminal used by the user. In this way, at least one of the approval password (which is also the viewing password) or the signature password may be set for each approver. Whether each user is an approver or a signer may be set in the address book described above.

Further, the approval password may also be deleted by setting an expiration date for the approval password or discarding the approval password by the requester.

Further, in the above description, two types of passwords are prepared: a signature password that allows writing to the contract and an approval password that does not allow writing. In this case, the approval password is handled in the same way as the viewing password. However, there may be some users who may not approve or sign but may allow viewing. In order to allow such users to view the contract, a viewing password may be set separately from the approval password as a password that does not allow writing.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory; and
a processor configured to:
generate and hold connection information necessary for accessing document data to be signed, which is stored in the memory, via a network;
transmit approval request information including connection information corresponding to the document data to a terminal device used by an approver;
authenticate the approver by collating the connection information transmitted from the terminal device with the held connection information, and then perform connection to the terminal device via the network;
cut off the network connection in a case where the approver finishes electronically signing the document data; and
discard the connection information corresponding to the document data.

2. The information processing apparatus according to claim 1, wherein the processor is configured to: in a case where there are a plurality of approvers,
generate the connection information for each approver;
transmit the approval request information to a terminal device used by each approver; and
treat the document data as an approved document data only after all the approvers have finished electronically signing the document data.

3. The information processing apparatus according to claim 2, wherein the processor is configured to perform processing for the plurality of approvers in parallel at a same time.

4. The information processing apparatus according to claim 1, wherein the connection information includes an address and a password for accessing the information processing apparatus.

5. The information processing apparatus according to claim 2, wherein the connection information includes an address and a password for accessing the information processing apparatus.

6. The information processing apparatus according to claim 1, wherein the processor is configured to set at least one of a viewing password used in viewing the document data or a signature password used in signing the document data for each approver, as a password to be included in the connection information provided to the approver.

7. The information processing apparatus according to claim 2, wherein the processor is configured to set at least one of a viewing password used in viewing the document data or a signature password used in signing the document data for each approver, as a password to be included in the connection information provided to the approver.

8. The information processing apparatus according to claim 6, wherein the processor is configured to discard the signature password corresponding to the approver in a case where detection is made that the approver has electronically signed the document data.

9. The information processing apparatus according to claim 7, wherein the processor is configured to discard the signature password corresponding to the approver in a case where detection is made that the approver has electronically signed the document data.

10. The information processing apparatus according to claim 1, wherein the processor is configured to automatically output the document data when the signature on the document data is completed.

11. The information processing apparatus according to claim 2, wherein the processor is configured to automatically output the document data when the signature on the document data is completed.

12. The information processing apparatus according to claim 1, wherein the processor is configured to automatically output document data when the approver signs the document data in which flag information that needs to be output when signed by the approver is set.

13. The information processing apparatus according to claim 1, wherein the processor is configured to prompt the approver who does not access the document data within a predetermined time to access the document data.

14. The information processing apparatus according to claim 2, wherein the processor is configured to prompt the approver who does not access the document data within a predetermined time to access the document data.

15. A non-transitory computer readable medium storing a program for causing a computer accessible to a memory to realize:

a function of generating and holding connection information necessary for accessing document data to be signed, which is stored in the memory, via a network;

a function of transmitting approval request information including connection information corresponding to the document data to a terminal device used by an approver;

a function of authenticating the approver by collating the connection information transmitted from the terminal device with the held connection information, and then performing connection to the terminal device via the network;

a function of cutting off the network connection in a case where the approver finishes electronically signing the document data; and a function of discarding the connection information corresponding to the document data.

16. An information processing apparatus comprising:

means for storing data; and means for generating and holding connection information necessary for accessing document data to be signed, which is stored in the means for storing data, via a network;

means for transmitting approval request information including connection information corresponding to the document data to a terminal device used by an approver;

means for authenticating the approver by collating the connection information transmitted from the terminal device with the held connection information, and then perform connection to the terminal device via the network;

means for cutting off the network connection in a case where the approver finishes electronically signing the document data; and means for discarding the connection information corresponding to the document data.

* * * * *